(12) United States Patent
Fakeih

(10) Patent No.: US 9,785,683 B2
(45) Date of Patent: *Oct. 10, 2017

(54) DATABASE AND METHOD FOR EVALUATING DATA THEREFROM

(76) Inventor: Adnan Fakeih, Jeddah (SA)

( * ) Notice: Subject to any disclaimer, the term of this patent is extended or adjusted under 35 U.S.C. 154(b) by 178 days.

This patent is subject to a terminal disclaimer.

(21) Appl. No.: 12/890,481

(22) Filed: Sep. 24, 2010

(65) Prior Publication Data

US 2011/0078177 A1    Mar. 31, 2011

Related U.S. Application Data

(60) Provisional application No. 61/246,031, filed on Sep. 25, 2009.

(51) Int. Cl.
*G06F 17/30* (2006.01)

(52) U.S. Cl.
CPC ........ *G06F 17/30548* (2013.01); *G06F 17/30* (2013.01); *G06F 17/30289* (2013.01); *G06F 17/30312* (2013.01); *G06F 17/30536* (2013.01)

(58) Field of Classification Search
CPC ..................................................... G06F 17/30
See application file for complete search history.

(56) References Cited

U.S. PATENT DOCUMENTS

| | | | |
|---|---|---|---|
| 5,809,483 A | 9/1998 | Broka et al. | |
| 6,396,317 B1 * | 5/2002 | Roller et al. | 327/113 |
| 6,901,383 B1 | 5/2005 | Ricketts et al. | |
| 7,432,926 B1 * | 10/2008 | Cherkas | 345/440 |
| 7,595,801 B1 * | 9/2009 | Cherkas | 345/440 |
| 7,685,044 B1 | 3/2010 | Robertson et al. | |
| 7,889,199 B1 * | 2/2011 | Cherkas | 345/440 |
| 2003/0157504 A1 | 8/2003 | Chee et al. | |
| 2004/0013292 A1 | 1/2004 | Raunig | |
| 2004/0185482 A1 | 9/2004 | Stuelpnagel et al. | |
| 2005/0256413 A1 | 11/2005 | Astrom et al. | |
| 2008/0235222 A1 | 9/2008 | Mojsilovic | |
| 2008/0265178 A1 * | 10/2008 | Johnston | G02B 26/10 250/492.1 |

FOREIGN PATENT DOCUMENTS

| | | |
|---|---|---|
| JP | 2007-150484 | 6/2007 |
| JP | 2007-271239 | 10/2007 |

OTHER PUBLICATIONS

Texas Instrument, "TI-83 Graphing Calculator Guidebook", 2001, Texas Instrument.*
Bromley et al., "Mathematics for the Practical Engineer", 1914, McGraw-Hill.*
Chandra R et al.: "Managing temporal financial data in an extensible database" 19th International conference on very large data bases, Data bases proceedings, Morgan Kaufmann Publishers, Palo Alto, CA 1993, pp. 302-313.
Elmasri R et al.: "Implementation options for time-series data", Temporal databases: Research and Practice, Proceedings of Seminar, Jan. 1, 1998 (Jan. 1, 1998), pp. 115-128.
Chaudhuri S et al.: "An Overview of Data Warehousing and OLAP Technology", SIGMOD Record, ACM, New York, NY, US, vol. 26, No. 1, Mar. 1, 1997 (Mar. 1, 1997), pp. 65-74.
Brown, R.G., "Smoothing, Forecasting and Prediction of Discrete Time Series," Dover Publications 2004, 17 pages.
Jiang et al., "Extraction of Investment Strategies based on Moving Averages: A Genetic Algorithm Approach," Hong Kong University of Science and Technology, 2003, 8 pages.
Kleinman, G., "The New Commodity Trading Guide: Breakthrough Strategies for Capturing Market Profits," FT Press, Mar. 2009, 10 pages.
Mori et al., "Vision and Activities for Massive and High Speed Data Processing Technologies toward Information Explosion Era," 90(07):612-613, *IT Innovation for Actualizing an Intellectual Creative Society*, Corporate Technical Report 2008-00084-007, Jul. 1, 2014, 9 pages.

* cited by examiner

*Primary Examiner* — Rehana Perveen
*Assistant Examiner* — Huen Wong
(74) *Attorney, Agent, or Firm* — Seed IP Law Group LLP

(57) ABSTRACT

A computer system for use in determining the minimum and/or maximum value of a specified subsequence of a sequence of values is disclosed. The computer system comprises a database that is configured to store a sequence of values, to identify a minimum and/or maximum value of the sequence of values, and to define at least a first subsequence of values and a second subsequence of values immediately following the first subsequence of values, wherein the boundary between the first and second subsequences is located at the position of either the minimum or maximum value of the sequence.

7 Claims, No Drawings

DATABASE AND METHOD FOR EVALUATING DATA THEREFROM

CROSS-REFERENCE TO RELATED APPLICATION

This application is a Non-Provisional application, based on U.S. Provisional Patent Application No. 61/246,031, entitled Database and Method for Evaluating Data Therefrom, filed Sep. 25, 2009, the content of which is incorporated in its entirety.

FIELD

The present invention relates to computer-implemented querying mechanisms for obtaining and/or evaluating data from a database, in particular to querying mechanisms for obtaining minimum or maximum values from a sequence of numerical values stored in the database.

BACKGROUND

A database is a structure for storing and relating data within e.g. a computer system. Different database architectures exist depending on the intended usage. The primary use for general purpose databases is to manage and facilitate data entry and retrieval in relation to the relevant application. A recent trend has been the emergence of specialized database architectures optimized to work with specific application domains.

Complex event processing (CEP) is a technology for low-latency filtering, correlating, aggregating and/or computing on real-world event data, e.g. financial data. Such data is usually generated at high frequencies and so needs to be saved in an appropriate database to allow it to be evaluated, whether in real time, or at a later stage. Several specialized database products have emerged which attempt to store such data, which is generated in quantities that normally overwhelm general purpose databases.

The following products are available for use in CEP applications, and provide different functionalities for manipulating CEP data.

| Product | Description | Technology |
|---|---|---|
| Vhayu velocity | High performance proprietary database optimized to work with high-frequency financial market data | Proprietary, non-relational in-memory database |
| KX systems KDB+ | High performance database to monitor real-time events and detect and report faults for data-intensive applications | Optimized, column-based database |
| StreamBase | Event processing platform which allows for development of applications that query and analyze high-volume real-time data streams | Integrated development environment along with specialized compiler |

These products aim to provide improvement of both underlying database technologies and processing capabilities. However, data storage and querying or retrieval of the data is still carried out according to conventional processes. While these databases are well-suited to performing traditional transaction-oriented operations, they do not provide an efficient means for allowing large amounts of contiguous data to be accessed and/or evaluated. The process of evaluating large contiguous datasets is central to responding to statistical descriptive data requests.

For example, when determining the minimum or maximum value in a string of values stored in a database, typically all the records in that data string have to be retrieved and evaluated to determine the location and/or magnitude of the minimum/maximum.

Thus, the operation is costly in terms of the I/O bus usage and/or network bandwidth utilisation in retrieving the dataset, and in terms of the computation required to evaluate the dataset. These costs will increase as the number of values in the requested data string increases.

In particular, comparative experimentation may be extremely costly, due to the cost of retrieving and evaluating a number of individual data sequences.

SUMMARY

In general, the present invention provides a database for storing data, which is configured to generate an intermediate description of the stored data, so as to allow for more efficient identification of the maximum and/or minimum value of a specified string of data that is of particular interest to the user.

The identification of minimum and/or maximum values in a data series may be useful in e.g. financial applications, where for example, the range of a stock price over a given time period (i.e. the difference between the maximum and minimum value) is an indication of volatility of the stock price or the market in general. Therefore, it may be advantageous to be able to locate the maximum and/or minimum values of e.g. a stock price for different time periods, through an efficient and effective process, having a low computing cost.

The identification of minimum and/or maximum values in a data series may also be useful in locating anomalous values in a data series. This is particularly important, for example, in the detection of fraud. By comparing the maximum and/or minimum value of e.g. a stock price with the normal fluctuations in the price for that stock, anomalous behaviour may be detected. Such a process requires many time periods to be evaluated (whether to build up a picture of the normal behaviour of e.g. the stock price, or for actual detection of fraud), and so requires efficient identification of maximum and/or minimum values in order to retain computing costs at acceptable levels.

Thus, in a first aspect, the present invention provides a database that is configured (i) to store a sequence of values;
(ii) to identify a minimum and/or maximum value of the sequence of values; and
(iii) to define at least a first subsequence of values, and a second subsequence of values immediately following the first subsequence of values,
wherein the boundary between the first and second subsequence is located at the position of either the minimum or maximum value of the sequence.

The database is provided in a computer system for use in determining the minimum and/or maximum value of a specified subsequence of a sequence of values.

The term "following" is a function of the directionality of the data sequence stored in the database. Typically, the directionality of the data sequence is defined by the order in which each value in the data sequence is entered into the database. Typically, therefore, recently-entered values are considered to "follow" previously-entered values. Thus, in general, values in the second subsequence have been entered more recently into the database than values of the first subsequence.

In many applications of the database, the stored data sequence describes the variation of a parameter with time. In this case, therefore, recent values of the parameter will "follow" older values of the parameter along the sequence of values.

The database of the first aspect of the present invention is configured to define at least two subsequences of values within the stored dataset, the boundary between the two subsequences being at the position of either the maximum or minimum value of the sequence.

In this way, a user of the database, seeking to identify the maximum or minimum value in a specified string of data defined by the user, can, at least as an initial step, determine whether this specified string of data spans the boundary between the two subsequences, and hence determine whether the maximum or minimum value of the entire database is included in the specified string of data. This avoids the user having to retrieve and evaluate the entire data string, and hence reduces the retrieval and computing costs associated with the query.

Therefore, in a second aspect, the present invention provides a computer-implemented method of determining the minimum and/or maximum value of a specified string of data defined by the user, comprising the steps of:
  (i) providing a database according to the first aspect of the invention;
  (ii) determining whether the specified string of data spans the first and second subsequences; and
  (iii) if the specified string of data spans the first and second subsequences, extracting the value at the boundary between the first and second subsequences.

In general, the data stored in the database will be divided into further subsequences, the boundary between adjacent subsequences being a local maximum value or a local minimum value. Thus, in the case where the database of the first aspect of the invention is configured to identify a minimum value in the sequence of stored data, the database is typically further configured
  (i) to identify a local minimum value, corresponding to the minimum value of the values following the first subsequence;
  (ii) to define a third subsequence of values immediately following the second subsequence of values, wherein the boundary between the second and third subsequence is located at the position of the local minimum value;
  (iii) to identify a further local minimum value, corresponding to the minimum value of the values following the nth subsequence, where n=2;
  (iv) to define an (n+2)th subsequence of values immediately following the (n+1)th subsequence of values, wherein the boundary between the (n+1)th and the (n+2)th subsequence is located at the position of the further local minimum value; and
  (v) to repeat steps (iii) and (iv) for all integer values of n up to n=k, wherein at n=k no further local minima are available to define a boundary between adjacent subsequences.

In the case that the database of the first aspect of the invention is configured to identify a maximum value in the sequence of stored data, the division of the database into further subsequences bounded by local maxima may be carried out in an analogous manner.

Typically, the data values in the first subsequence are each provided with labels corresponding to the value of the minimum or maximum value that lies at the boundary between the first and second subsequence.

Analogously, data values in any one of the further subsequences may be provided with labels corresponding to the value of the local minimum or maximum value that lies at the boundary between that subsequence and the following subsequence. Typically, all the subsequences up to the last boundary value (whether minimum or maximum) are labelled in this way. In this case, preferably the data values in the final subsequence (i.e. the data values after the last boundary value) are also labelled. Preferably, the data values in the final subsequence are each provided with a label corresponding to the value of that record.

The terms "last" and "final" refer to the directionality of the database. Thus, the "last" boundary value is typically the boundary value associated with the most recently-entered data, e.g. the boundary value between the kth and (k+1)th subsequences. Similarly, the "final" subsequence is the subsequence containing the most-recently entered data in the data sequence stored in the database.

Once the records in the database have been labelled in this way, the method of the second aspect of the invention may be used to determine the maximum or minimum of a specified data string. In this case, the specified data string typically has an end point that corresponds to the end point of the sequence of values in the database and the minimum or maximum value of the specified data string is determined by reading the label of the value at the location of the start point of the data string.

Thus, the method of the second aspect of the invention allows the minimum or maximum of a specified data string to be determined by retrieving a single data value. Therefore, the cost to the user of carrying out this analysis is simply the cost of retrieving this data value.

Conventional databases typically require all values in a data string to be retrieved and analysed before the minimum and/or maximum value can be determined, and therefore result in high retrieval and computational costs to the user.

By contrast, the method of the second aspect of the invention, used in conjunction with the database of the first aspect of the invention provides a significant reduction in the I/O bus usage and/or network bandwidth required by the user to analyse a string of data stored in the database.

Therefore, by generating an intermediate description of the data stored in the database, and making this intermediate description accessible to the user, the present invention allows the user to query the database, and evaluate the data stored in the database, at a reduced computing cost.

The terms "start point" and "end point" are related to the directionality of the database. Typically, the "end point" represents the most recently-entered record in the data sequence, and the "start point" represents a record entered at a previous time.

The method of the second aspect of the invention is to a certain extent counter-intuitive, in that it would not be readily adopted by a person using purely mental processes to identify the maximum and/or minimum value in a sequence of data. Such a person, acting without the assistance of a computer, would tend simply to scan the data values in sequence to identify the maximum or minimum value, and would wish to avoid using the complex, counter-intuitive method of the second aspect of the invention.

However, the conventional method of scanning the data series to identify the maximum and/or minimum values (whether through a purely mental process or as part of a computer-implemented method) is unsuitable for assessing large volumes of data. In these cases, the more complex, counter-intuitive steps of the method of the second invention allow the process to be readily adapted for implementation using technical means, thus allowing large volumes of data to be evaluated rapidly and efficiently.

In certain embodiments of the invention, the database of the first aspect of the invention may be configured to generate two intermediate descriptions of the stored data sequence, the first intermediate description facilitating the identification of the minimum value in a specified string of data and the second intermediate description facilitating the identification of the maximum value in a specified string of data.

The database may be configured to store data representing the variation of a parameter with time. This parameter may be, e.g., a parameter describing a financial transaction. Typically, the parameter is measured at time intervals of less than 0.5 s, preferably less than 0.1 s, most preferably less than 0.05 s.

Typically, the database is configured to store data sequences having over 1000 values.

Application Areas

The invention is beneficial to applications that have data streams arriving continuously in a rapid manner with time-varying and unpredictable lengths. Traditional DBMS approaches with their limited memory are unsuitable for such applications which require rapid and continuous loading of data in addition to continuous querying and processing [M. Kontaki, A. N. Papadopoulos and Y. Manolopoulos, Adaptive similarity search in streaming time series with sliding windows, *Data & Knowledge Engineering*, Volume 63, Issue 2, (November 2007), Pages: 478-502]. An additional difficulty when attempting to perform standard analytic analysis to such data is the inability to obtain random access due to the continuous and unpredictable behavior of the data streams, which are only readable once or a limited number of times [P. Tsai, Mining top-k frequent closed itemsets over data streams using the sliding window model, Expert Systems with Applications: An International Journal, Volume 37, Issue 10, (October 2010), Pages: 6968-6973]. This requires modified analytic methods which provide fast answers to range queries that do not require multiple data scans.

Query Types

The invention mechanism is capable of performing the following query types that are required for continuous data applications [F. Buccafurri and G. Lax, Approximating sliding windows by cyclic tree-like histograms for efficient range queries, *Data & Knowledge Engineering*, Volume 69, Issue 9 (September 2010), Pages: 979-997]:
  Point query: return the k-th data point of the data stream
  Range query: return aggregate data within given time interval
  Similarity query: return true whether a similar pattern occurs in the data stream [P. Capitani and P. Ciaccia, Warping the time on data streams, *Data & Knowledge Engineering*, Volume 62, Issue 3 (September 2007), Pages: 438-458]

Application Examples

Financial

Market Transparency

There is an increasing demand on financial market authorities to ensure their participants that their markets are fair and transparent. As trading volumes increase (hundreds of gigabytes per day in some markets), it becomes increasingly difficult to disseminate the data to all the participants. Only institutional and big investors can afford to have full access to such data. This by itself makes transparency a big issue when it comes to retail investors who cannot afford to receive such huge data. The difficulty is compounded when not only transactional data is required, but also more sophisticated data such as order movement and non-traditional execution information also becomes a necessity. What the invention allows for is the ability to present accurate aggregate data to all the participants upon which they can select their desired data using the customizable window sizes mechanism. This offers several advantages, first, computations are performed only once when storing the cumulative data. The user then requests the desired data range and receives only the start and end data elements which enable completion of the request. This results in a massive computational savings, especially with an increased number of users/requests since the upper bound on computation has been capped during data generation. Second, sending the user only the limits of the desired data range results in a huge reduction in bandwidth effectively placing a cap on the communications cost regardless of the data range request. Third, the ability to extract custom data ranges with no significant computational or bandwidth overhead allows for large amounts of simultaneous real-time analysis and experimentation. Fourth, allowing the participants to perform all their data queries without having to deliver the entire data range helps to protect the authorities' data from unlawful usage or transfer. Finally, the invention provides a means for making the market fully transparent to all participants at the aggregational level, without disclosing all individual data ticks which are usually sold at high prices.

Telecommunications

Network Traffic Monitoring

Optimization of network utilization relies on the management of router and switch queues [E. Hernandez-Orallo and J. Vila-Carbo, Network queue and loss analysis using histogram-based traffic models, *Computer Communications*, Volume 33, Issue 2 (February 2010), Pages: 190-201], [S. K. Tanbeer, C. F. Ahmed, B. Jeong and Y. Lee, Sliding window-based frequent pattern mining over data streams, *Information Sciences*, Volume 179, Issue 227, November 2009, Pages 3843-3865]. In general, modeling a network consists of feeding traffic into finite sized queues at given service rates with the goal of determining information about queue utilization. Custom distributions and models are then used to model such traffic thus requiring the continuous determination of mean and volatility values. With increasingly larger networks, the amount of data generated and consequent computations increases, making it more difficult to tailor reports to individual user needs. The invention can make three major contributions to this problem:
  Currently fixed period monitoring reports (e.g. updated every 24 hours) are sent to users, this is due to the difficulty in constructing custom reports for each user based on their individual requirements. The invention allows for pre-computation and storage of data that can then be used by users to make their own custom reports, thereby alleviating the need for custom computation on a per-user level.
  Statistical computations are easily transformable into cumulative computations and this allows for minimizing the amount of data and bandwidth usage per user request since only the end point data items of the required range need to be sent.

Increased data security for the provider since only data pertinent for the user request is sent rather than the entire data set.

Intrusion Detection

Information in data servers must be protected from network borne attacks [H. Li and S. Lee, Mining frequent itemsets over data streams using efficient window sliding techniques, *Expert Systems with Applications*, Volume 36, Issue 2, Part 1, March 2009, Pages 1466-1477], [W. Wang, X. Guan and X. Zhang, Processing of massive audit streams for real-time anomaly intrusion detection, *Computer Communications*, Volume 31, Issue 1 (January 2008), Pages: 58-72]. The two basic approaches consist of signature based detection where malicious behavior is detected by matching against previously stored prototypical attacks and anomaly detection where the profile of a normal user is maintained and an attempt is made to identify unacceptable deviation as a possible attack. The signature based approach can be adapted to make use of the invention's distance measurement mechanism where distances to a predefined set of signatures are recorded in real-time. The unique advantage of the invention is that not only distances to the complete signature are obtainable, but also distances to signature subsets are possible. This allows for quick experimentation and testing capabilities that do not require time consuming distance re-computation. Anomaly detection also benefits from the ability to perform calculations over data subsets. This is especially suitable for automated calibration approaches where multiple time periods can be measured simultaneously with no additional computation and vastly reduced bandwidth costs compared to a conventional approach.

Engineering

Concrete Structures

Monitoring technology is used to track the performance of mass damping systems for tall concrete structures to enhance their damping and maintain their safety [J. M. W. Brownjohn, E. P. Carden, C. R. Goddard and G. Oudin, Real time performance monitoring of tuned mass damper system for a 183 m reinforced concrete chimney. *Journal of Wind Engineering and Industrial Aerodynamics* Vol. 8, No. 3, March 2010, pp. 169-179]. Accelerometers are connected to the structure and remotely monitored to provide real-time information to determine whether the structures displacement exceeds critical thresholds. A large-scale application of this monitoring technology over hundreds or even thousands of structures would require a unified data management system such as the invention in order to allow all users to perform their required monitoring tasks simultaneously. With the compute-once, use-by-many approach, it is possible to efficiently have many automated systems monitoring different phenomena simultaneously through the use of different sized windows and data combinations. In addition, the low bandwidth requirement resulting from the cumulative data storage structure means that the monitoring sites can be remotely located with little overhead communications cost.

Drilling Optimization

The goal is to optimize the drilling process to minimize cost while maintaining operational safety standards. This is done by continuously assessing the drilling process throughout the operation such that the overall rate of penetration is maximized based on cumulative footage drilled. The basic decision that must be made is to compromise between maximizing the utilization of the drill head and minimizing project down time due to a damaged drill head and the associated lead time to replace and order new parts. This is performed by continuously analyzing several variables such as weight on bit and rotary speed, applying such data to mathematical models and making a decision as late as possible to maximize bit head usage while not endangering progress of the drilling project. An advantage of a solution based on the invention is that time windows can be customized at any time with a negligible computational penalty. This is important when drilling through different geological formations, varying the drilling speed or even real-time calibration of models as work progresses and ensures the ability to perform comprehensive analysis regardless of the initial strategy. This also allows for evaluating several different models simultaneously using the same initial data. In addition, the low bandwidth requirement is an important feature especially when drilling in harsh remote areas where it is difficult to locate analysts and acquiring large bandwidth communication channels is often cost prohibitive.

Scientific Data Analysis

Earthquake Prediction

Early warning devices can provide a short warning before the arrival of major tremors based on the different propagation speeds of the various vibrations produced. This application is distinguished by large amounts of continuous data that need near instantaneous processing in order to be of value. Measurement centers can also make use of readings from neighboring centers in their effort to increase the detection time before an earthquake. Due to the large amount of data generated by each measurement device, this is prohibitively expensive for all but the largest centers. However, with the use of the invention as the data storage backbone, hundreds or even thousands of neighboring centers can share data making use of the low bandwidth requirement of the invention. In addition, the negligible calculation overhead for different sliding window sizes means that multiple levels of detection can be simultaneously performed in order to detect different size anomalies. This is important for experimentation since a large number of potential models can be simultaneously machine tested and potentially applied.

Tropical Atmosphere Ocean

In-situ environmental sensors are physically located in the environment they are monitoring and their time-series data is transmitted continuously to a single data repository [D. J. Hill and B. S. Minsker, Anomaly detection in streaming environmental sensor data: A data-driven modeling approach, *Environmental Modelling & Software*, Volume 25, Issue 9, September 2010, Pages 1014-1022]. There is a need for automated data quality assurance and control to detect and identify anomalous data that deviates significantly from historical patterns. Such anomaly detection can also be used in the field of adaptive monitoring where anomalous data indicates phenomena that may require further investigation. The invention can be used as the main data depository where the customizable sliding windows mechanism can be used to perform simultaneous data assurance tests, thereby adding an additional layer of sophistication for quality monitoring. In addition, the same mechanism can be used to simultaneously detect multiple abnormal phenomena or allow for straight forward changes in detection strategy with a no additional computational cost. An added advantage is the ability to serve other remote users with their data requests with only a minimal communications investment due to the low bandwidth data transmission mechanism.

DETAILED DESCRIPTION

The following explanation and examples demonstrate how a database can be adapted to allow the minimum value in a specified data string to be identified more easily. The maximum value in a specified data string may be identified in an analogous manner. The algorithms used to construct and query the database are set out below.

For simplicity, the examples set out below relate to relatively short data series having up to about 20 values. However, it is clear that the principles of the processes described may be readily adapted to considerably larger data series, where they allow evaluation of a data series to be carried out particularly effectively through the use of technical means.

Starting with a sample data sequence stored in a database forming part of a computer system, the goal is to generate an intermediate description of the records in the data sequence to simplify identification and extraction of a minimum value in a subsequence of interest. This intermediate description divides the sequence into a series of subsequences that are bounded by local minima. The generation of the intermediate description and the series of subsequences is achieved through a technique known as coverage mapping.

Example 1

An example of the technique of coverage mapping will be illustrated using the sample dataset shown in Table 1. The sample dataset of Table 1 has 10 records, which are each assigned to a location. The location numbers define a "direction" of the database, i.e. the location numbers increase in a forward direction of the database and decrease in a backward direction of the database. In general, data records are entered into the database in time order, that is, the first location contains the oldest record and the highest location number contains the most recent record.

TABLE 1

| location | 1 | 2 | 3 | 4 | 5 | 6 | 7 | 8 | 9 | 10 |
|---|---|---|---|---|---|---|---|---|---|---|
| record | 5 | 16 | 4 | 10 | 21 | 22 | 13 | 6 | 7 | 7 |

To generate the intermediate description, the following operations must be performed in turn for each data record $r_c$ in the sequence, moving from the oldest record to the most recent record.

Operation 1

Starting from the current location, check to find the location of the earliest value which is covered. That is, move backwards in the database, in the direction of older records, until a record ($r_1$) is encountered that has a value less than or equal to the current record ($r_c$). The location of the record ($r_1$) is then used to define a coverage value for the current location. The coverage value is given by (location($r_1$)+1). If no record matches the search criterion then location($r_1$)=0, and the coverage value is 1.

Table 2 shows the dataset of Table 1, updated to show the coverage value for each record.

TABLE 2

| location | 1 | 2 | 3 | 4 | 5 | 6 | 7 | 8 | 9 | 10 |
|---|---|---|---|---|---|---|---|---|---|---|
| record | 5 | 16 | 4 | 10 | 21 | 22 | 13 | 6 | 7 | 7 |
| coverage | 1 | 2 | 1 | 4 | 5 | 6 | 5 | 4 | 9 | 10 |

The coverage value is an identifier of the local trend in the dataset. If the local trend is for the record value to remain constant or to increase with time (e.g. in the subsequence between locations 4 and 6), then the coverage value is the same as the location value. If the local trend is for the record value to decrease with time (e.g. in the subsequence of records 7 and 8), then the coverage value will be lower than the location value.

Operation 2

If the coverage value is less than the location of the record ($r_c$), then label all previous records from (but not including) the coverage location ($r_1$) up to (and including) the current location ($r_c$) with the value of the record at the current location. This may mean that labels allocated when this operation was carried out on the previous record in the sequence are overwritten. Table 3 shows a modified version of the database of Table 1, in which operations 1 and 2 have been carried out for all 10 records in turn.

TABLE 3

| location | 1 | 2 | 3 | 4 | 5 | 6 | 7 | 8 | 9 | 10 |
|---|---|---|---|---|---|---|---|---|---|---|
| record | 5 | 16 | 4 | 10 | 21 | 22 | 13 | 6 | 7 | 7 |
| coverage | 1 | 2 | 1 | 4 | 5 | 6 | 5 | 4 | 9 | 10 |
| label | 4 | 4 | 4 | 6 | 6 | 6 | 6 | 6 | 7 | 7 |

Once operations 1 and 2 have been carried out for each record of the sequence in turn, the modified database can be used for identification of the minimum value in the inputted data sequence.

In order to locate the minimum value in a specified data string that extends back from the most recent record, it is necessary to identify the label at the location marking the beginning of the specified data string. In this example, if location 10 contains the most recent data value, the minimum value of the last five records will be given by the label of the fifth most recent record, i.e. the label at location 6. Similarly, the minimum value of the last nine records is given by the label of the ninth most recent record, i.e. the label at location 2.

In this example, the technique for locating the minimum value is only valid if the data string of interest extends back from the most recent record. The database (including the coverage and label values for each record) need to be updated for each new record added to the database.

Example 2

Table 4 presents a detailed example showing how the database is built up in a series of stages, as each new record is entered in the database. Thus, at stage 1, the database has 1 record at location 1, while at stage n, the database has n records, the $n^{th}$ record being at location n. As each new record is inserted into the database, coverage and label values are updated, as explained in the row labeled "algorithm step".

TABLE 4

|  | Location | Record | Coverage | Label |
|---|---|---|---|---|
| Stage 1 | 1 | 19 | 1 | 19 |

Algorithm step (stage 1): Upon searching for record values smaller and older than the new record, we reach the start of the database. Thus, coverage value of the new record is 1 and the new label is 19

| Stage 2 | 1 | 19 | 1 | 5 |
|---|---|---|---|---|
|  | 2 | 5 | 1 | 5 |

Algorithm step (stage 2): Upon searching for record values smaller and older than the new record, we reach the start. Thus, coverage value of the new record is 1 and the new labels are 5 starting from location 1

| Stage 3 | 1 | 19 | 1 | 3 |
|---|---|---|---|---|
|  | 2 | 5 | 1 | 3 |
|  | 3 | 3 | 1 | 3 |

Algorithm step (stage 3): Upon searching for record values smaller and older than the new record, we reach the start. Thus, coverage value of the new record is 1 and the new labels are 3 starting from location 1

| Stage 4 | 1 | 19 | 1 | 3 |
|---|---|---|---|---|
|  | 2 | 5 | 1 | 3 |
|  | 3 | 3 | 1 | 3 |
|  | 4 | 17 | 4 | 17 |

Algorithm step (stage 4): Upon searching for record values smaller and older than the new record, we reach location 3. Thus, coverage value of the new record is 3 + 1 = 4, and the label for the new record is 17

| Stage 5 | 1 | 19 | 1 | 3 |
|---|---|---|---|---|
|  | 2 | 5 | 1 | 3 |
|  | 3 | 3 | 1 | 3 |
|  | 4 | 17 | 4 | 5 |
|  | 5 | 5 | 4 | 5 |

Algorithm step (stage 5): Upon searching for record values smaller and older than the new record, we reach location 3. Thus, coverage value of the new record is 3 + 1 = 4, and the new labels are 5 (ranging from locations 4 to 5)

At each stage, the database may be used to determine the minimum value in a specified data string extending backwards from the most recent record. Thus, at stage n, the minimum value in a specified data string extending backwards from the $n^{th}$ record may be determined.

For example, at stage 4, the minimum value of the last two records is given by the label of the second most recent record, i.e. the label at location 3, which in this case is equal to 3.

At stage 5, the minimum value of the last two records is given by the label of the second most recent record, i.e. the label at location 4, which in this case is equal to 5.

Example 3

Tables 5-8 show how an intermediate description can be generated for longer data series. In these Tables, coverage and labels have been updated relative to the most recently-entered record value. The Tables present snapshots of the database for stages 5, 10, 15, and 20 (i.e. after 5, 10, 15, and 20 records have been entered, respectively). Sample queries are presented for data strings of interest extending backwards from the most recent record at each particular stage.

TABLE 5

(Stage 5)

| location | record | coverage | label |
|---|---|---|---|
| 1 | 19 | 1 | 3 |
| 2 | 5 | 1 | 3 |
| 3 | 3 | 1 | 3 |
| 4 | 17 | 4 | 5 |
| 5 | 5 | 4 | 5 |

Sample query Get minimum of last 2 entries at stage 5.
Output from sample query Minimum of last two entries = 5 (i.e. the label of location 4)

TABLE 6

(Stage 10)

| location | record | coverage | label |
|---|---|---|---|
| 1 | 19 | 1 | 0 |
| 2 | 5 | 1 | 0 |
| 3 | 3 | 1 | 0 |
| 4 | 17 | 4 | 0 |
| 5 | 5 | 4 | 0 |
| 6 | 13 | 6 | 0 |
| 7 | 19 | 7 | 0 |
| 8 | 13 | 7 | 0 |
| 9 | 17 | 9 | 0 |
| 10 | 0 | 1 | 0 |

Sample query Get minimum of last 5 entries at stage 10
Output from sample query Minimum of last 5 entries = 0 (i.e. the label of location 6)

TABLE 7

(Stage 15)

| location | record | coverage | label |
|---|---|---|---|
| 1 | 19 | 1 | 0 |
| 2 | 5 | 1 | 0 |
| 3 | 3 | 1 | 0 |
| 4 | 17 | 4 | 0 |
| 5 | 5 | 4 | 0 |
| 6 | 13 | 6 | 0 |
| 7 | 19 | 7 | 0 |
| 8 | 13 | 7 | 0 |
| 9 | 17 | 9 | 0 |
| 10 | 0 | 1 | 0 |
| 11 | 3 | 11 | 3 |
| 12 | 16 | 12 | 9 |
| 13 | 9 | 12 | 9 |
| 14 | 18 | 14 | 15 |
| 15 | 15 | 14 | 15 |

Sample query Get minimum of last 5 entries at stage 15.
Output from sample query Minimum of last 5 entries = 3 (i.e. the label of location 11)

TABLE 8

(Stage 20)

| location | record | coverage | label |
|---|---|---|---|
| 1 | 19 | 1 | 0 |
| 2 | 5 | 1 | 0 |
| 3 | 3 | 1 | 0 |
| 4 | 17 | 4 | 0 |
| 5 | 5 | 4 | 0 |
| 6 | 13 | 6 | 0 |
| 7 | 19 | 7 | 0 |
| 8 | 13 | 7 | 0 |
| 9 | 17 | 9 | 0 |
| 10 | 0 | 1 | 0 |
| 11 | 3 | 11 | 3 |
| 12 | 16 | 12 | 3 |
| 13 | 9 | 12 | 3 |
| 14 | 18 | 14 | 3 |
| 15 | 15 | 14 | 3 |
| 16 | 14 | 15 | 3 |
| 17 | 7 | 13 | 3 |
| 18 | 3 | 13 | 3 |
| 19 | 3 | 20 | 3 |
| 20 | 4 | 21 | 4 |

Sample query Get min of last 11 entries at stage 20
Output from sample query Minimum of last 11 entries = 0 (i.e. the label of location 10)

Determination of Maximum Values in a Subsequence

The methods and algorithms set out in examples 1-3 for constructing and querying a database may be modified to allow the maximum value of a subsequence of a database to be identified.

Again, the database records are each assigned to a "location". In general, the records are entered in to the database in time order, such that the oldest record is assigned to location 1, while the $n^{th}$ record is assigned to location n. Thus, the location numbers increase in a forward direction of the database, e.g. as the records become more recent, and decrease in a backward direction of the database, e.g. as the records become older.

An intermediate description of the data is generated in which the following operations are performed in turn for each data record $r_c$ in the sequence, moving from the oldest record to the most recent record. The intermediate description must be updated each time that a new record is added.

Operation 1: Starting from the current location, check to find the location of the earliest value which is covered. That is, move backwards in the database, in the direction of older records, until a record ($r_1$) is encountered that has a value greater than or equal to the current record ($r_c$). The location of the record ($r_1$) is then used to define a coverage value for the current location. The coverage value is given by (location($r_1$)+1). If no record matches the search criterion then location($r_1$)=0, and the coverage value is 1.

Operation 2: If the coverage value is less than the location of the record ($r_c$), then label all previous records from (but not including) the coverage location ($r_1$) to the current location ($r_c$) with the value of the record at the current location. This may require that labels allocated when performing operation 2 on the previous record in the sequence are overwritten.

Example 4

Table 9 shows how a database for use in determining maximum values is built up in a series of stages, as each new record is entered in the database. Thus, at stage 1, the database has 1 record at location 1, while at stage n, the database has n records, the $n^{th}$ record being at location n. As each new record is inserted into the database, coverage and label values are updated, as explained in the row labeled "algorithm step".

TABLE 9

| location | record | coverage | label |
|---|---|---|---|
| Stage 1 | | | |
| 1 | 19 | 1 | 19 |

Algorithm step (Stage 1): Upon searching for record values larger and older than the new record, we reach the start. Thus, coverage value of the new record is 1 and the new label is 19

| Stage 2 | | | |
|---|---|---|---|
| 1 | 19 | 1 | 19 |
| 2 | 5 | 2 | 5 |

Algorithm step (Stage 2): Upon searching for record values larger and older than the new record, we reach location 1. Thus, coverage value of the new record is 1 + 1 = 2 and the label for the new record is 5

| Stage 3 | | | |
|---|---|---|---|
| 1 | 19 | 1 | 19 |
| 2 | 5 | 2 | 5 |
| 3 | 3 | 3 | 3 |

Algorithm step (Stage 3): Upon searching for record values larger and older than the new record, we reach location 2. Thus, coverage value of the new record is 2 + 1 = 3 and the label for the new record is 3

| Stage 4 | | | |
|---|---|---|---|
| 1 | 19 | 1 | 19 |
| 2 | 5 | 2 | 17 |
| 3 | 3 | 3 | 17 |

TABLE 9-continued

| location | record | coverage | label |
|---|---|---|---|
| 4 | 17 | 2 | 17 |

Algorithm step (Stage 4): Upon searching for record values larger and older than the new record, we reach location 1. Thus, coverage value of the new record is 1 + 1 = 2 and the new labels are 17 (ranging from locations 2 to 4)

| Stage 5 | | | |
|---|---|---|---|
| 1 | 19 | 1 | 19 |
| 2 | 5 | 2 | 17 |
| 3 | 3 | 3 | 17 |
| 4 | 17 | 2 | 17 |
| 5 | 5 | 5 | 5 |

Algorithm step (Stage 5): Upon searching for record values larger and older than the new record, we reach location 4. Thus, coverage value of the new record is 4 + 1 = 5 and the label for the new record is 5

This database allows the maximum value to be determined for a specified data string extending backwards from the most recent record for a given stage. Thus, for example, at stage 5, the maximum value within the last four records is given by the label at location 2, which in this case, has a value of 17.

In this example, queries to locate the maximum value in a subsequence of interest are only valid for data strings extending backwards from the most recent record added to the database.

While the invention has been described in conjunction with the examples described above, many equivalent modifications and variations will be apparent to those skilled in the art when given this disclosure. Accordingly, the examples of the invention set forth above are considered to be illustrative and not limiting. Various changes to the described examples may be made without departing from the spirit and scope of the invention.

What is claimed:

1. A computer system for use in determining a minimum value and/or a maximum value of a specified sequence of values that enables a user in a financial market to request a desired data range and receive only start and end data elements, the computer system comprising:
   a database that stores the specified sequence of values, to identify the minimum value and/or the maximum value of the specified sequence of values, and to define at least a first subsequence of values comprising a plurality of values, a second subsequence of values immediately following the first subsequence of values, distance measurements between the first subsequence of values and the second subsequence of values immediately following the first subsequence of values, and intermediate description values, wherein the database stores intermediate description values that are evaluated for each time step,
   wherein the intermediate description values are used in combination by the computer system in subsequent calculations to generate descriptive data, wherein the intermediate description values correspond to a start point and an end point of a range of interest, wherein calculation periods for the intermediate description values are calculated over unpredictable periods of time, and wherein calculation periods for the intermediate description values are calculated over time-varying periods;
   wherein a boundary between the first subsequence of values and the second subsequence of values is located at a position of either the minimum value or maximum value of the specified sequence of values;

determining whether a specified subsequence spans the first subsequence of values and second subsequence of values; and if the specified subsequence spans the first subsequence of values and second subsequence of values, extracting a value at the boundary between the first and second subsequences; and wherein the database further provides a plurality of labels, one label for each of the plurality of values in the first subsequence of values, each label corresponding to the same minimum or maximum value that lies at the boundary between the first and second subsequence, thereby causing at least one label in the specified sequence to be numerically different than its associated value, wherein the database receives new values in the specified sequence, and wherein the labels are updated if a new minimum or maximum value has been added that is larger than a previous minimum or maximum value.

2. A computer system according to claim 1, wherein the boundary between the first and second subsequence is located at the position of the minimum value of the specified sequence of values, and wherein the database:
(i) identifies a local minimum value, corresponding to a minimum value of values following the first subsequence of values;
(ii) defines a third subsequence of values immediately following the second subsequence of values, wherein a boundary between the second subsequence of values and the third subsequence of values is located at a position of the local minimum value;
(iii) identifies a further local minimum value, corresponding to a minimum value of values following the nth subsequence of values, where n=2;
(iv) defines an (n+2)th subsequence of values immediately following the (n+1)th subsequence of values, wherein a boundary between the (n+1)th and the (n+2)th subsequences is located at a position of the further local minimum value; and
(v) repeats steps (iii) and (iv) for all integer values of n up to n=k, wherein at n=k no further local minima are available to define a boundary between adjacent subsequences.

3. A computer system according to claim 1, wherein the boundary between the first and second subsequence is located at the position of the maximum value of the sequence, and wherein the database:
(i) identifies a local maximum value, corresponding to a maximum value of values following the first subsequence of values;
(ii) defines a third subsequence of values immediately following the second subsequence of values, wherein a boundary between the second subsequence of values and the third subsequence of values is located at a position of the local maximum value;
(iii) identifies a further local maximum value, corresponding to a maximum value of values following the nth subsequence, where n=2;
(iv) defines an (n+2)th subsequence of values immediately following the (n+1)th subsequence of values, wherein the boundary between the (n+1)th and the (n+2)th subsequence is located at a position of the further local maximum value; and
(v) repeats steps (iii) and (iv) for all integer values of n up to n=k, wherein at n=k no further local maxima are available to define a boundary between adjacent subsequences.

4. A computer system according to claim 3, wherein the database provides a label for each value in each subsequence n up to n=k, the label corresponding to a value of a local minimum value or a maximum value that lies at a boundary between the nth and (n+1)th subsequences.

5. A computer system according to claim 4, wherein the database provides a label for each value in the (k+1)th subsequence, the label corresponding to the individual value.

6. A computer-implemented method of determining a minimum value and/or maximum value of a specified sequence of values that enables a user in a financial market to request a desired data range and receive only start and end data elements, the method comprising:

(i) determining, by a computer system, the minimum and/or maximum value of the specified subsequence of values, the computer system comprising:

a database that stores the specified sequence of values, to identify the minimum value and/or the maximum value of the specified sequence of values, and to define at least a first subsequence of values comprising a plurality of values, a second subsequence of values immediately following the first subsequence of values, distance measurements between the first subsequence of values and the second subsequence of values immediately following the first subsequence of values, and intermediate description values, wherein the database stores intermediate description values that are evaluated for each time step, and wherein a boundary between the first and second subsequence is located at a position of either the minimum or maximum value of the sequence;

(ii) determining whether the specified subsequence spans the first subsequence of values and second subsequence of values; and (iii) if the specified subsequence spans the first subsequence of values and second subsequence of values, extracting a value at the boundary between the first and second subsequences;

(iv) determining a plurality of labels, one label for each of the plurality of values in the first subsequence of values, each label corresponding to the same minimum value or the maximum value, wherein the database receives new values in the specified sequence, and wherein the labels are updated if a new minimum or maximum value has been added that is larger than a previous minimum or maximum value;

wherein the intermediate description values are used in combination by the computer system in subsequent calculations to generate descriptive data, wherein the intermediate description values correspond to a start point and an end point of a range of interest, wherein calculation periods for the intermediate description values are calculated over unpredictable periods of time, and wherein calculation periods for the intermediate description values are calculated over time-varying periods.

7. A method according to claim 6, wherein the specified subsequence has a start point and an end point, and wherein the minimum or maximum value of the specified subsequence is determined by reading the label at a location of the start point of the specified subsequence.

\* \* \* \* \*